United States Patent
Chung et al.

[11] Patent Number: 5,974,208
[45] Date of Patent: Oct. 26, 1999

[54] SLIDING-FREQUENCY GUIDING FILTER FOR SOLITON TRANSMISSION

[75] Inventors: Yun-Chur Chung, Taejon; Hoon Kim; Jin-Hwan Jang, both of Kyunggi-Do, all of Rep. of Korea

[73] Assignee: Korea Advanced Institute of Science and Technology, Yusong-Ku, Rep. of Korea

[21] Appl. No.: 08/921,945

[22] Filed: Aug. 28, 1997

[30] Foreign Application Priority Data

Aug. 30, 1996 [KR] Rep. of Korea .................. 96-36688

[51] Int. Cl.⁶ .......................................... G02B 6/00
[52] U.S. Cl. .................. 385/27; 385/147; 385/12; 372/6; 359/127
[58] Field of Search .................. 385/27, 31, 147, 385/12; 372/6, 49; 359/173, 179, 127, 188, 195

[56] References Cited

U.S. PATENT DOCUMENTS 5,463,489  10/1995  Mamyshev et al. .............. 359/173
5,557,441   9/1996  Mollenauer ....................... 359/173

*Primary Examiner*—Phan T. H. Palmer
*Attorney, Agent, or Firm*—Knobbe Martens Olson & Bear, LLP

[57] ABSTRACT

The present invention relates to a sliding-frequency guiding filter which is capable of guiding soliton pulses to hundreds of different resonant frequencies by designing the device so that the filter can automatically offset its peak resonant frequency from the frequency of incoming soliton pulses. The sliding-frequency guiding filter comprises the followings: a coupler to tap some of incoming soliton signals; a wafer whose one half is coated by multilayered dielectric on both sides while leaving the other half uncoated, where the soliton signals tapped through the coupler is directed to coated half and uncoated half of the wafer, respectively; and, a thermoelectric cooler attached to the coated side of the wafer. The sliding-frequency guiding filter, made of the same design, can be applied throughout the soliton transmission line instead of the numerous filters all operating at different resonant frequencies. Accordingly, the sliding-frequency guiding filter can be practically used in ultralong distance soliton transmission system.

15 Claims, 2 Drawing Sheets

SLIDING-FREQUENCY GUIDING FILTER FOR SOLITON TRANSMISSION

FIELD OF THE INVENTION

The present invention relates to a sliding-frequency guiding filter for soliton transmission, more specifically, to a sliding-frequency guiding filter which is capable of guiding soliton pulses to hundreds of different resonant frequencies by designing the device so that the filter can automatically offset its peak resonant frequency from the frequency of incoming soliton pulses.

BACKGROUND OF THE INVENTION

Soliton is a unique pulse which can be transmitted over long distance in its characteristic form by compensating the color dispersion effect of optic fiber through non-linear formation. The soliton has been used for ultralong distance transmission regardless of the color dispersion limitation, by employing an optical amplifier in the soliton transmission to compensate the loss caused by optic fiber. However, accumulation of amplified spontaneous emission ("ASE") noise, caused by the optical amplifiers which are distributed at periodic intervals to compensate the loss by optical fiber, could impose a significant limitation on the maximum transmission distance (which is known as "Gorden-Haus effect").

Recently, in order to avoid Gorden-Haus effect, a sliding-frequency guiding filter (hereinafter referred to as "SFG filter") has been suggested in the art (see: L. F. Mollenauer et al., Optics Lett., 17(22);1575–1577(1992)). In this filter, bandpass filters with slightly different resonant frequency are distributed along the optical amplifiers to prevent the ASE noise accumulation, grounded on a fact that: soliton, a non-linear wave, can be guided along the resonant frequency of the filter, while ASE noise cannot be guided. SFG filter can increase the soliton transmission capacity, by reducing the limitation of transmission distance caused by Gordon-Haus effect and by decreasing the interaction of soliton signals. Also, application of wavelength division multiplexing (WDM) system in the soliton control in a frequency domain allows more channels to be used, since the interaction with soliton signals from different channels can be reduced (see: U.S. Pat. No. 5,357,364).

However, the conventional SFG filter, though it can be realized easily by employing simple Fabry-Perot filter, has not been practically applied in the art because hundreds of these filters operating at slightly different resonant frequencies from each other are required in the long distance soliton transmission system. For example, for the transoceanic soliton transmission system applied to a distance of about 10,000 km over the Pacific ocean, approximately 300 SFG filters, under a consideration of an optical amplification distance of 30 to 50 km, are required and each filter should be designed, manufactured and implemented in a separate manner.

Accordingly, there are strong reasons for exploring and developing an improved SFG filter in order to solve the said problems in the art.

SUMMARY OF THE INVENTION

In this regard, the present inventors developed a novel sliding-frequency guiding filter for soliton transmission which is capable of guiding soliton pulses to hundreds of different resonant frequencies by employing a polished wafer. The sliding-frequency guiding filter can automatically offset its resonant frequency from the frequency of incoming soliton pulses, since the difference between the resonant frequency and the incoming soliton frequency of the sliding-frequency guiding filter is always constant, while the resonant frequency should be different at each filter in case of the conventional sliding-frequency guiding filter.

A primary object of the present invention is, therefore, to provide a novel sliding-frequency guiding filter for soliton transmission which can replace numerous filters all operating at different resonant frequencies in the soliton transmission line.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

To accomplish the object of the present invention, a sliding-frequency guiding filter ("SFG filter") is fabricated by the process comprising the steps of: dividing a wafer into two halves; coating a multilayered dielectric on both sides of one half of a polished wafer while leaving the other half uncoated; and, attaching a thermoelectric cooler ("TE cooler") to the coated side of the wafer to control temperature of the coated surface.

In general, the wafer employed in the SFG filter satisfied the following requirements: it should be transparent at a wavelength of soliton signals, e.g., 1.5 $\mu$m; it should have a wide range of refractive index which is dependent on the temperature change, in order to track the frequency of incoming soliton as a temperature range of the filter; and, it should have a relatively high refractive index of 2 to 4 to guide soliton signals in an uncoated form. Preferably, Si, GaAs, ZnSe and ZnS are employed as a substrate material for the wafer, while Si is most preferably employed since it is an abundant material having a wide range of refractive index ($\delta n/\delta T = 14 \times 10^5$) as a function of temperature and a relatively high refractive index of 3.48, and it has been applied in the manufacture of wafer by the well-known technology.

A preferred embodiment of the present invention is explained in detail with references on the accompanying drawings, which should not be taken to limit the scope of the present invention.

Figure 1:
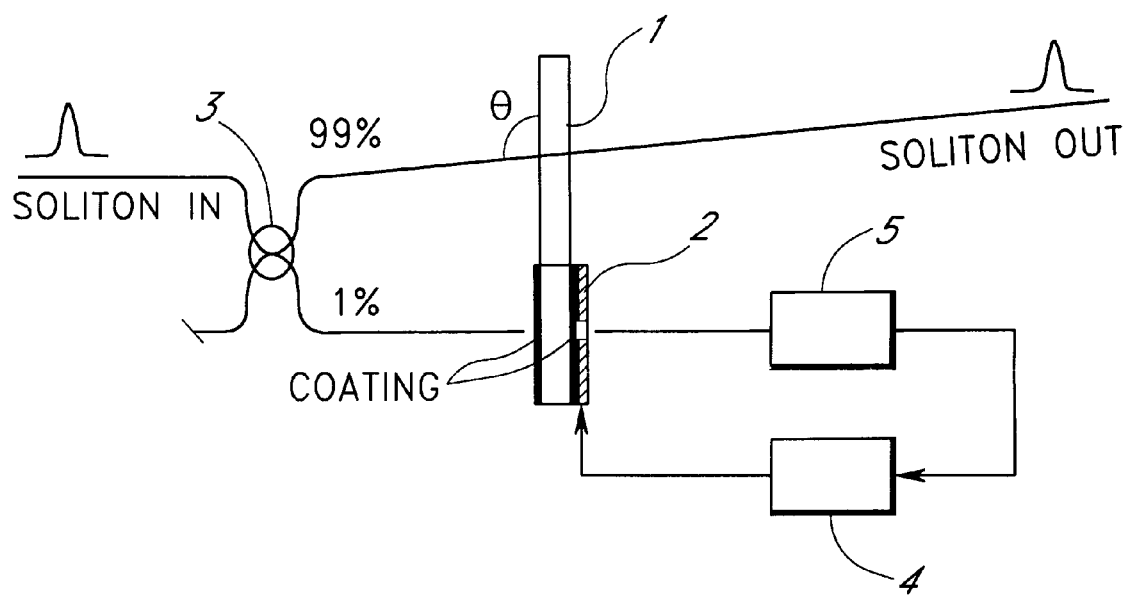
FIG. 1 is a schematic diagram depicting the sliding-frequency guiding filter for soliton transmission of the present invention.

FIG. 1 is a schematic diagram depicting a SFG filter of the present invention. The SFG filter is made by coating multilayer dielectric on both sides of one half of silicon wafer (1), while leaving the other half uncoated, where the coated side functions as an etalon filter with a narrow transmission band, to lock the resonant frequency of the coated etalon to the frequency of incoming soliton. "Etalon" is employed to mean a device being consisted of two lateral reflecting membrane. The etalon filter should have a reflexising of about 96% in order to lock the resonant frequency of etalon to the frequency of incoming soliton with a deviation of about 10 MHz. Since an etalon with low finesse of about 2.0 is formed at the uncoated side due to the highly refractive characteristic of silicon, it plays a role of a sliding-frequency guiding filter. On the other hand, a thermoelectric cooler (2) is attached to the coated etalon to control temperature of the coated surface. In this regard, silicon controls the resonant frequency of the etalon, depending on a slight change of temperature of the thermoelectric cooler, since it has a wide range of refractive index as a function of temperature.

Referring to FIG. 1, a coupler (3) taps 99% of incoming soliton to the uncoated side of a silicon wafer (1) and 1% to the coated side. Incident angle of 99% of incoming soliton to the silicon wafer (1) is represented as θ. In case of Fabry-Perot filter, the transmission characteristic is changed depending on the incident angle (θ).

In accordance with the SFG filter of the invention, a servoloop (4) is employed to lock the resonant frequency of a coated etalon to the frequency of incoming soliton. In describing the present invention, the term "lock" is employed to mean to an act of matching the frequency of a soliton with the resonant frequency of a filter. Thus, the resonant frequency of a coated side and the frequency of a soliton can be matched by changing a part (1%) of incoming soliton to an electrical signal through a photodiode (5) and applying a regulatory signal to a thermoelectric cooler (2) through the servoloop (4).

Since the resonant frequency of a coated etalon is locked to the frequency of a soliton and the incident angle of a soliton to the coated etalon is constant, the resonant frequency of an uncoated etalon can be located at the desired one from the resonance frequency of the coated etalon, which is locked already to the frequency of a soliton, by changing the incident angle of an incoming soliton to the uncoated etalon.

Meanwhile, the resonant frequency can be adjusted by the change of incident angle depending on the temperature distribution of a silicon etalon. Since the thermoelectric cooler (2) is attached to the coated side of an etalon, temperature of the uncoated side of the etalon becomes more closer to the ambient temperature as the etalon goes away from the thermoelectric cooler (2), provided that the ambient temperature remains constant. Owing to the wide range of refractive index of silicon depending on the temperature change, the resonant frequency of the coated side can be locked at the desired one from the resonant frequency of the coated side, being dependent on the temperature distribution. The said method allows the reduction of the insertion loss of a filter by the rectangular incidence of a soliton to the etalon.

Figure 2:
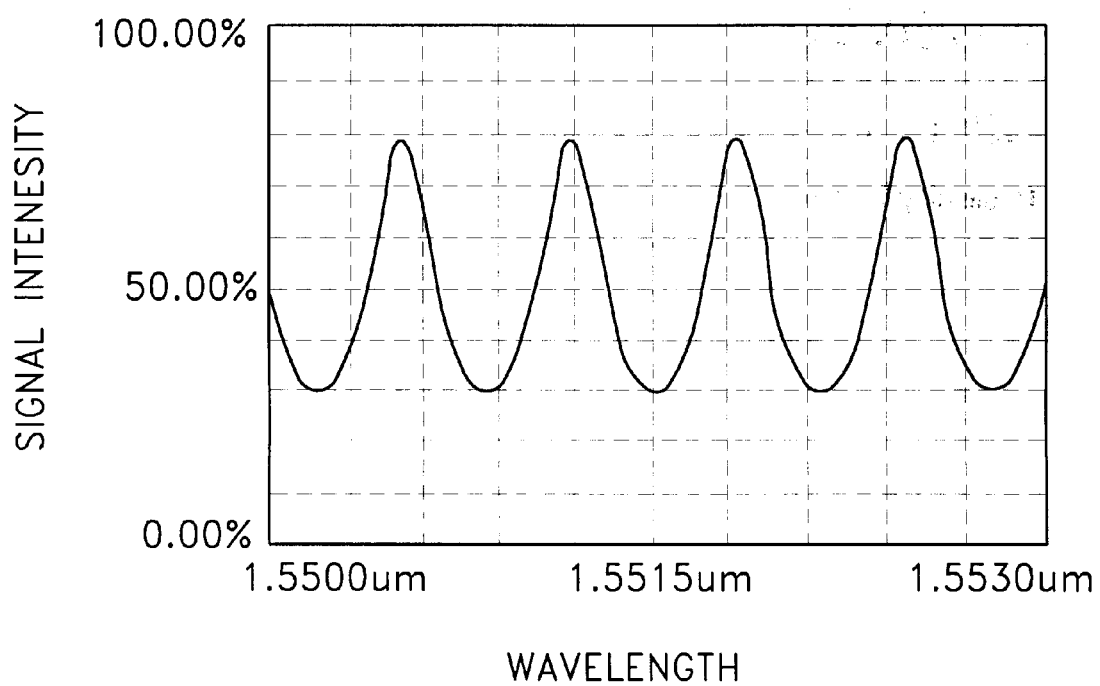
FIG. 2 is a graph showing the transmission characteristics of an etalon filter made of silicon water.

FIG. 2 is a graph showing the transmission characteristics of an etalon filter made of silicon water. FIG. 2 demonstrates that silicon which is transparent at a wavelength of 1.5 $\mu$m and has a wide range of refractive index as a function of temperature, is appropriate for locking the resonant frequency of a filter to the frequency of a soliton by the change of temperature. Furthermore, the silicon is preferably employed in SFG filter since it forms an etalon filter which has a wide band of transmission and a broad curve of transmission characteristic in an uncoated state.

Figure 3:
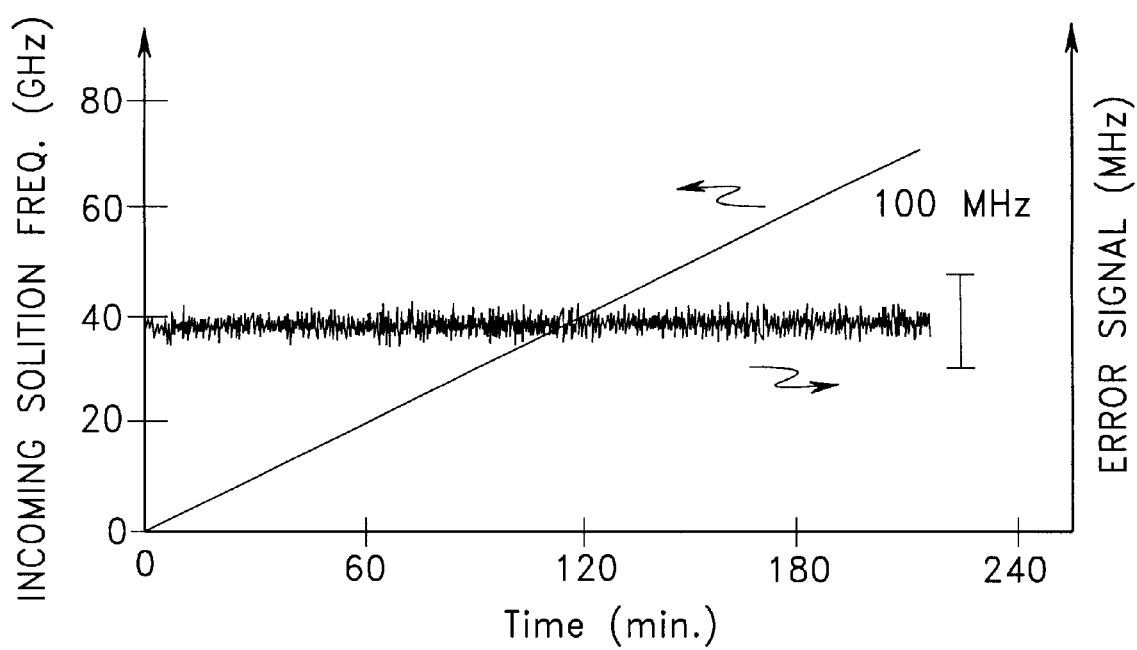
FIG. 3 is a graph showing the trackability of sliding-frequency guiding filter in accordance with the frequency change of incoming soliton.

FIG. 3 is a graph showing the trackability of the SFG filter in accordance with the frequency range of incoming soliton. FIG. 3 illustrates that errors which may be occurred between the resonant frequency of a coated side and the frequency of a soliton against the frequency of differently incoming soliton, when the resonant frequency of a filter is locked to the frequency of a soliton. Since the frequency of a soliton is guided by the SFG filter, the frequency of incoming soliton to SFG filter of the invention becomes different at each filter. The SFG filter of the present invention can track the frequency of each incoming soliton, since it is designed to have a resonant frequency being shifted from each different soliton frequency by a specified frequency. Referring to FIG. 3, when total sliding-frequency is greater than 70 GHz, the SFG filter can track a soliton frequency within a range of 50 MHz, where the temperature change of a thermoelectric cooler attached to a coated etalon is below 6.5° C.

As clearly illustrated and demonstrated as above, the present invention provides a sliding-frequency guiding filter for soliton transmission which is capable of guiding soliton pulses to hundreds of different resonant frequencies, by designing the device that the frequency of different incoming soliton can be tracked by locating the resonant frequency at the shifted place by a specified frequency from each different soliton frequency. Therefore, the sliding-frequency guiding filter, made of the same design, can be applied throughout the soliton transmission line instead of the numerous filters all operating at different resonant frequencies. Accordingly, the sliding-frequency guiding filter can be practically used in ultralong distance soliton transmission system.

Although the preferred embodiments of the present invention have been disclosed for illustrative purpose, those who are skilled in the art will appreciate that various modifications, additions and substitutions are possible, without departing from the scope and spirit of the invention as disclosed in the accompanying claims.

What is claimed is:

1. A sliding-frequency guiding filter which can automatically offset its peak resonant frequency from frequency of incoming soliton pulses, the filter comprising a first section to lock its resonant frequency to the frequency of the incoming soliton pulses.

2. The sliding-frequency guiding filter of claim 1, further comprising a second section to guide the incoming soliton pulses to a frequency which is offset from the resonant frequency of the first section of the filter.

3. A sliding-frequency guiding filter which can automatically offset its peak resonant frequency from frequency of incoming soliton pulses, the filter comprising a coupler to tap some part of incoming soliton signals; a wafer comprising a coated section with multilayered dielectric and an uncoated section, whereby the soliton signals tapped through the coupler is directed to the coated section and the uncoated section of the wafer, respectively; and a thermoelectric cooler being attached to the coated section of the wafer.

4. The sliding-frequency guiding filter of claim 3, wherein the wafer is made of a material which is transparent at a wavelength of soliton signals, has a wide range of refractive index as a function of temperature and has a high refractive index of 2 to 4 to guide soliton signals in an uncoated state.

5. The sliding-frequency guiding filter of claim 4, wherein the material is selected from the group consisting of Si, GaAs, ZnS, ZnSe and polymer which are transparent at 1.5 $\mu$m of wavelength of soliton signals.

6. The sliding-frequency guiding filter of claim 3, wherein the coupler taps less soliton signals to the uncoated section than the coated section of the wafer.

7. A sliding-frequency guiding filter as defined in claim 3, wherein the coated section is one half of the wafer and the uncoated section is the other half of the wafer.

8. A sliding-frequency guiding filter as defined in claim 3, wherein the multilayered dielectric is coated on both sides of the coated section of the wafer.

9. A soliton transmission system, comprising a plurality of sliding-frequency guiding filters of claim 3.

10. A method of guiding signals using a filter, the method comprising:

the filter receiving incoming signals transmitted along a first frequency;

the filter processing the incoming signals to obtain a second frequency offset from the first frequency; and the filter retransmitting the signals along the second frequency.

11. A method as defined in claim 10, wherein the processing the incoming signals comprises using a part of the incoming signals to obtain the second frequency.

12. A method as defined in claim 11, wherein the filter comprises a first section and a second section, wherein the processing the incoming signals comprises:

locking a resonant frequency of the first section of the filter to the first frequency by using the part of the part of the incoming signals; and offsetting a resonant frequency of the second section of the filter from the first resonant frequency of the filter.

13. A method as defined in claim 12, wherein the first section of the filter comprises a wafer coated with multilayered dielectric and a temperature adjuster is attached to the first section, wherein the part of the incoming signals is guided to the first section of the filter, and the temperature adjuster is controlled according to the incoming signals to adjust the temperature of the first section, thereby the resonant frequency of the first section of the filter is locked to the first frequency.

14. A method as defined in claim 13, wherein the second section of the filter comprises an uncoated wafer, wherein the remaining part of the incoming signals is guided to the second section of the filter at an incident angle, and the incident angle is adjusted to locate the resonant frequency of the second section of the filter at the second frequency offset from the first frequency.

15. A method as defined in claim 10 wherein the signals are soliton pulses, and the filter is a sliding-frequency guiding filter.

\* \* \* \* \*